United States Patent
Zhao et al.

(10) Patent No.: US 12,555,347 B2
(45) Date of Patent: Feb. 17, 2026

(54) METHOD, APPARATUS AND DEVICE FOR EXTRACTING IMAGE FEATURES, AND STORAGE MEDIUM

(71) Applicant: INSPUR SUZHOU INTELLIGENT TECHNOLOGY CO., LTD., Jiangsu (CN)

(72) Inventors: Jian Zhao, Shandong (CN); Gang Dong, Shandong (CN); Hongzhi Shi, Shandong (CN); Qichun Cao, Shandong (CN); Xingchen Cui, Shandong (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 365 days.

(21) Appl. No.: 18/246,299

(22) PCT Filed: Sep. 28, 2021

(86) PCT No.: PCT/CN2021/121418
§ 371 (c)(1),
(2) Date: Mar. 22, 2023

(87) PCT Pub. No.: WO2022/148071
PCT Pub. Date: Jul. 14, 2022

(65) Prior Publication Data
US 2023/0360358 A1 Nov. 9, 2023

(30) Foreign Application Priority Data
Jan. 7, 2021 (CN) .......................... 202110018532.8

(51) Int. Cl.
*G06V 10/00* (2022.01)
*G06V 10/40* (2022.01)
*G06V 10/82* (2022.01)

(52) U.S. Cl.
CPC .............. *G06V 10/40* (2022.01); *G06V 10/82* (2022.01)

(58) Field of Classification Search
CPC ........ G06V 10/40; G06V 10/82; G06V 10/28; G06V 10/44; G06N 3/08; G06N 3/045
See application file for complete search history.

(56) References Cited

U.S. PATENT DOCUMENTS

| 2019/0020871 A1 | 1/2019 | Xu et al. |
| 2019/0138882 A1 | 5/2019 | Choi et al. |

(Continued)

FOREIGN PATENT DOCUMENTS

| CN | 108596143 A | 9/2018 |
| CN | 108960207 A | 12/2018 |

(Continued)

OTHER PUBLICATIONS

International search report for PCT/CN2021/121418 mailed on Jan. 4, 2022.

(Continued)

*Primary Examiner* — Xiao Liu
(74) *Attorney, Agent, or Firm* — Dennemeyer & Associates LLC

(57) ABSTRACT

Provided are a method, apparatus and device for extracting image features, and a storage medium. The method includes: obtaining parameters to be quantized of a network layer in a neural network model; determining whether values of the parameters to be quantized are all positive numbers; when the values of the parameters to be quantized are all positive numbers, executing, based on an asymmetric linear quantization logic, a quantization operation on the parameters to be quantized; when the values of the parameters to be quantized are not all positive numbers, executing, based on a symmetric linear quantization logic, a quantization operation on the (Continued)

parameters to be quantized; and extracting features of an input image by using the neural network model for which the quantization operation has been executed.

18 Claims, 2 Drawing Sheets

(56) References Cited

U.S. PATENT DOCUMENTS

| | | | |
|---|---|---|---|
| 2019/0243610 A1* | 8/2019 | Lin | G06N 3/0495 |
| 2019/0294413 A1* | 9/2019 | Vantrease | G06F 7/5095 |
| 2022/0036155 A1* | 2/2022 | Guevara | G06N 3/063 |

FOREIGN PATENT DOCUMENTS

| | | |
|---|---|---|
| CN | 108985453 A | 12/2018 |
| CN | 110119809 A | 8/2019 |
| CN | 110322414 A | 10/2019 |
| CN | 111401518 A | 7/2020 |
| CN | 111950728 A | 11/2020 |
| CN | 112733863 A | 4/2021 |

OTHER PUBLICATIONS

International search report for Chinese application 202110018532.8, filed Jan. 7, 2021.

* cited by examiner

METHOD, APPARATUS AND DEVICE FOR EXTRACTING IMAGE FEATURES, AND STORAGE MEDIUM

CROSS REFERENCE TO RELATED APPLICATION

The present disclosure is a National Stage Filing of the PCT International Application No. PCT/CN2021/121418 filed on Sep. 28, 2021, which claims the priority to Chinese Patent Application No. 202110018532.8, filed to the China National Intellectual Property Administration on Jan. 7, 2021 and entitled "Method, Apparatus and Device for Extracting Image Features, and Storage Medium", which is incorporated in its entirety herein by reference.

TECHNICAL FIELD

The present disclosure relates to the field of deep learning, and in particular to a method, apparatus and device for extracting image features, and a storage medium.

BACKGROUND

Currently, in the field of deep learning, data is usually input into a neural network model trained in advance so that deduction could be performed based on the input data to output a corresponding deduction result.

In the currently used neural network model, a data type of parameter data is generally a floating-point data type having high accuracy. With continuous increase of the number of network layers and the number of channels of a neural network, the total number of parameters in the commonly used neural network models will increase, such that a neural network model based deduction process needs to occupy a large number of storage spaces, computing resources and communication bandwidths of a device. In order to ensure stable operation of the neural network model in the device, it is often necessary to quantize parameter data in the neural network model. At present, there are two general methods for quantizing the trained neural network model, which are respectively symmetric linear quantization and asymmetric linear quantization. The asymmetric linear quantization takes into account the problem of uneven distribution of activation values, and therefore has higher accuracy than that of the symmetric linear quantization. However, the asymmetric linear quantization introduces zero point bias, which brings about the necessity of subtracting the bias value from input features of a node in the process of quantizing the model, and this undoubtedly increases the amount of computation of the deduction process, and further affects efficiency of extracting the image features by the neural network model.

Thus, it may be seen that how to ensure accuracy of extracting the image features by the neural network model and simultaneously improve efficiency of extracting the image features by the neural network model is a problem to be solved by those having ordinary skill in the art.

SUMMARY

Embodiments of the present disclosure provide a method, apparatus and device for extracting image features, and a storage medium, which improve efficiency of extracting image features by a neural network model while ensuring accuracy of extracting the image features by the neural network model.

In order to solve the above technical problem, the embodiments of the present disclosure provide a method for extracting image features. The method includes: obtaining parameters to be quantized of a network layer in a neural network model;
  determining whether values of the parameters to be quantized are all positive numbers;
  when the values of the parameters to be quantized are all positive numbers, executing, based on an asymmetric linear quantization logic, a quantization operation on the parameters to be quantized;
  when the values of the parameters to be quantized are not all positive numbers, executing, based on a symmetric linear quantization logic, a quantization operation on the parameters to be quantized; and
  extracting features of an input image by using the neural network model for which the quantization operation has been executed.

In some exemplary implementations, the method may further include:
  correcting counted values of nodes having a data point-by-point addition or concat operation that execute operations including shortcut and concat, to make quantization coefficients of respective converged branches consistent.

In some exemplary implementations, the correcting counted values of nodes having a data point-by-point addition or concat operation that execute operations including shortcut and concat, to make quantization coefficients of respective converged branches consistent includes:
  determining the nodes having the data point-by-point addition or concat operation that execute the operations including shortcut and concat as nodes to be corrected;
  selecting a maximum value in counted values of all precursor nodes corresponding to a current node and setting the selected maximum value as counted values of all the precursor nodes, wherein the current node is any one of all the nodes to be corrected;
  executing an exclusive OR operation on identity values of all the precursor nodes corresponding to the current node to obtain an operation value;
  when the operation value is an asymmetric identity value, updating output identity values of all the precursor nodes to the operation value, and updating input identity values of nodes, which take outputs of the precursor nodes as inputs, as the operation value; and
  when the operation value is a symmetric identity value, updating both an input identity value and an output identity value of the current node to the operation value, and updating input identity values of nodes, which take an output of the current node as an input, to the operation value.

In some exemplary implementations, the executing a quantization operation on the parameters to be quantized includes:
  for initial weight quantized values of the network layer, selecting each value in a first preset value interval as a rounding point, wherein the initial weight quantized values are computed according to weight values and weight quantization coefficients corresponding to the weight values, and the weight quantization coefficients are computed according to counted values corresponding to weights and weight bandwidth values set by the counted values;
  determining whether an absolute value of a decimal part of each initial weight quantized value is greater than the rounding point;

when the absolute value of the decimal part of the initial weight quantized value is greater than the rounding point, rounding up the initial weight quantized value to obtain a target weight quantized value;

otherwise, rounding down the initial weight quantized value to obtain the target weight quantized value;

convolving the target weight quantized values and input features of the network layer to obtain convolution values;

computing mean square errors based on the convolution values and an original convolution value; and setting a target weight quantized value having a smallest mean square error among the convolution values as a final weight quantized value.

In some exemplary implementations, the method may further include:

quantizing initial bias values according to the weight quantization coefficients and quantization coefficients of the input features to obtain quantized bias values.

In some exemplary implementations, the executing a quantization operation on the parameters to be quantized includes:

computing a scaling coefficient (SC) according to an equation $$SC = \frac{s_0}{s_w * s_i},$$

wherein $s_0$ represents an activation quantization coefficient, $s_w$ represents the weight quantization coefficient, $s_i$ represents the quantization coefficient of the input features, and the activation quantization coefficient is computed according to a counted value corresponding to a node and an activation bandwidth value set by the counted value;

computing a displacement value n according to an equation $SC=2^{-n}$;

executing a convolution operation on the weight quantized values and quantized values of the input features to obtain an operation result, and using sum values of the operation result and the quantized bias values as initial convolution results; and executing displacement processing on the initial convolution results according to the displacement value to obtain activation quantized values.

In some exemplary implementations, before the extracting features of an input image by using the neural network model for which the quantization operation has been executed, the method may further include:

normalizing the input image.

Some embodiments of the present disclosure further provide an apparatus for extracting image features. The apparatus includes an obtaining unit, a determination unit, an asymmetric quantization unit, a symmetric quantization unit and an extraction unit, where the obtaining unit is configured to obtain parameters to be quantized of a network layer in a neural network model;

the determination unit is configured to determine whether values of the parameters to be quantized are all positive numbers;

the asymmetric quantization unit is configured to execute, based on an asymmetric linear quantization logic, a quantization operation on the parameters to be quantized when the values of the parameters to be quantized are all positive numbers;

the symmetric quantization unit is configured to execute, based on a symmetric linear quantization logic, a quantization operation on the parameters to be quantized when the values of the parameters to be quantized are not all positive numbers; and the extraction unit is configured to extract features of an input image by using the neural network model for which the quantization operation has been executed.

In some exemplary implementations, the apparatus may further include a correction unit, where the correction unit is configured to correct counted values of nodes having a data point-by-point addition or concat operation that execute operations including shortcut and concat, to make quantization coefficients of respective converged branches consistent.

In some exemplary implementations, the correction unit includes a counting subunit, a selection subunit, an operation subunit, a first update subunit and a second update subunit, where the counting subunit is configured to determine the nodes having the data point-by-point addition or concat operation that execute the operations including shortcut and concat as nodes to be corrected;

the selection subunit is configured to select a maximum value in counted values of all precursor nodes corresponding to a current node and set the selected maximum value as counted values of all the precursor nodes, wherein the current node is any one of all the nodes to be corrected;

the operation subunit is configured to execute an exclusive OR operation on identity values of all the precursor nodes corresponding to the current node to obtain an operation value;

the first update subunit is configured to update output identity values of all the precursor nodes to the operation value, and update input identity values of nodes, which take outputs of the precursor nodes as inputs, as the operation value when the operation value is an asymmetric identity value; and the second update subunit is configured to update both an input identity value and an output identity value of the current node to the operation value, and update input identity values of nodes, which take an output of the current node as an input, as the operation value when the operation value is a symmetric identity value.

In some exemplary implementations, for the operation of executing a quantization operation on initial weight quantized values of a network layer, the apparatus includes a selection unit, a weight value determination unit, a rounding-up unit, a rounding-down unit, a computation unit and a setting unit, where the selection unit is configured to select each value in a first preset value interval as a rounding point for initial weight quantized values of the network layer, wherein the initial weight quantized values are computed according to weight values and weight quantization coefficients corresponding to the weight values, and the weight quantization coefficients are computed according to counted values corresponding to weights and weight bandwidth values set by the counted values;

the weight value determination unit is configured to determine whether an absolute value of a decimal part of each initial weight quantized value is greater than the rounding point; trigger the rounding-up unit when the absolute value of the decimal part of the initial weight quantized value is greater than the rounding point; and otherwise, trigger the rounding-down unit;

the rounding-up unit is configured to round up the initial weight quantized value to obtain a target weight quantized value;

the rounding-down unit is configured to round down the initial weight quantized value to obtain the target weight quantized value;

the computation unit is configured to convolve the target weight quantized values and input features of the network layer to obtain convolution values, and compute mean square errors based on the convolution values and an original convolution value; and the setting unit is configured to set a target weight quantized value having a smallest mean square error among the convolution values as a final weight quantized value.

In some exemplary implementations, the apparatus may further include a bias quantization unit, where the bias quantization unit is configured to quantize initial bias values according to the weight quantization coefficients and quantization coefficients of the input features to obtain quantized bias values.

In some exemplary implementations, for the operation of executing a quantization operation on the parameters to be quantized, the apparatus includes a scaling coefficient computation unit, a displacement value computation unit, a serving unit and a displacement unit, where the scaling coefficient computation unit is configured to compute a scaling coefficient (SC) according to an equation $$SC = \frac{s_0}{s_w * s_i},$$

$s_o$ represents an activation quantization coefficient, $s_w$ represents the weight quantization coefficient, $s_i$ represents the quantization coefficient of the input features, and the activation quantization coefficient is computed according to a counted value corresponding to a node and an activation bandwidth value set by the counted value;

the displacement value computation unit is configured to compute a displacement value n according to an equation $SC=2^{-n}$;

the serving unit is configured to execute a convolution operation on the weight quantized values and quantized values of the input features to obtain an operation result, and use sum values of the operation result and the quantized bias values as initial convolution results; and the displacement unit is configured to execute displacement processing on the initial convolution results according to the displacement value to obtain activation quantized values.

In some exemplary implementations, the apparatus may further include a normalization unit, where the normalization unit is configured to normalize the input image before the extracting features of an input image by using the neural network model for which the quantization operation has been executed.

Some embodiments of the present disclosure further provide a device for extracting image features. The device includes:

a memory for storing a computer program; and a processor for implementing operations of the method for extracting image features of any one of the above when executing the computer program.

Some embodiments of the present disclosure further provide a computer-readable storage medium. The computer-readable storage medium stores a computer program, where the computer program implements, when executed by a processor, operations of the method for extracting image features of any one of the above.

According to the method for extracting image features provided in the embodiments of the present disclosure, the parameters to be quantized of the network layer in the neural network model are obtained, and then whether the values of the parameters to be quantized are all positive numbers is further determined. When the values of the parameters to be quantized are all positive numbers, the quantization operation is executed on the parameters to be quantized based on the asymmetric linear quantization logic; and when the values of the parameters to be quantized are not all positive numbers, the quantization operation is executed on the parameters to be quantized based on the symmetric linear quantization logic. Since asymmetric linear quantization has higher accuracy compared with symmetric linear quantization, but introduces zero point bias, which brings about the necessity of removing the zero point bias based on the negative values obtained after asymmetric linear quantization and thus further generates an additional operation overhead, when the values of the parameters to be quantized are all positive numbers, the method uses the asymmetric linear quantization logic to execute the quantization operation on the parameters to be quantized, and when the values of the parameters to be quantized are not all positive numbers, the method uses the symmetric linear quantization logic to execute the quantization operation on the parameters to be quantized, such that accuracy of parameter data quantization in the neural network model may be ensured. The neural network model for which the quantization operation has been executed is utilized to extract the features of the input image, such that efficiency of extracting the image features by the neural network model may be improved while accuracy of extracting the image features by the neural network model may be ensured. In addition, the embodiments of the present disclosure further provide an apparatus and device for extracting image features, and a storage medium, which also have the beneficial effects described above.

BRIEF DESCRIPTION OF THE DRAWINGS

In order to more clearly illustrate the embodiments of the present disclosure, accompanying drawings required in the embodiments are briefly introduced below. Obviously, the accompanying drawings in the following description are only related to some of the embodiments of the present disclosure, and those having ordinary skill in the art would further be able to derive other accompanying drawings from these accompanying drawings without creative efforts.

DETAILED DESCRIPTION

The technical solutions in embodiments of the present disclosure are clearly and completely described below in combination with accompanying drawings in the embodiments of the present disclosure. Apparently, the embodiments described are merely some embodiments rather than all embodiments of the present disclosure. Based on the embodiments in the present disclosure, all other embodiments obtained by those having ordinary skill in the art without creative efforts fall within the scope of protection of the present disclosure.

In the currently used neural network model, a data type of parameter data is generally a floating-point data type having high accuracy. With continuous increase of the number of network layers and the number of channels of a neural network, the total number of parameters in the commonly used neural network models will increase, such that a neural network model based deduction process needs to occupy a large number of storage spaces, computing resources and communication bandwidths of a device. In order to ensure stable operation of the neural network model in the device, it is often necessary to quantize parameter data in the neural network model. At present, there are two general methods for quantizing the trained neural network model, which are respectively symmetric linear quantization and asymmetric linear quantization. The asymmetric linear quantization takes into account the problem of uneven distribution of activation values, and therefore has higher accuracy than that of the symmetric linear quantization. However, the asymmetric linear quantization introduces zero point bias, which brings about the necessity of subtracting the bias value from input features of a node in the process of quantizing the model, and this undoubtedly increases the amount of computation of the deduction process, and further affects efficiency of extracting the image features by the neural network model.

To this end, the embodiments of the present disclosure provide a method for extracting image features, which may improve efficiency of extracting image features by a neural network model while ensuring accuracy of extracting the image features by the neural network model.

In order to make those having ordinary skill in the art better understand the solution of the present disclosure, the present disclosure is further described in detail below in combination with the accompanying drawings and exemplary embodiments.

Figure 1:
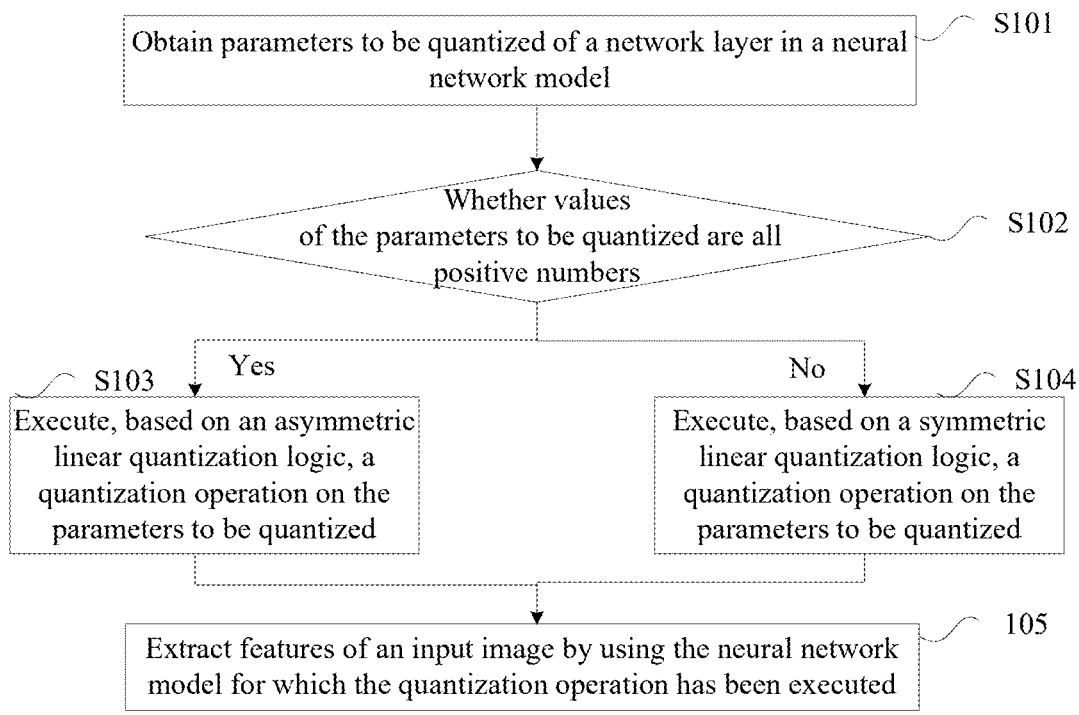
FIG. 1 is a flow chart of a method for extracting image features provided in some embodiments of the present disclosure.

With reference to FIG. 1, the embodiments of the present disclosure provide a method for extracting image features. The method includes operations S101 to S105. At S101, parameters to be quantized of a network layer in a neural network model are obtained.

It should be noted that a neural network (NN) is a complex network system formed by extensively interconnecting a large number of simple processing units (which are called as neurons), reflects a number of basic features of human brain functions, and is a highly complex nonlinear dynamic learning system. The NN has massively parallel and distributed storage and processing, and self-organizing, self-adaptive and self-learning capabilities, and are particularly suitable for dealing with inaccurate and fuzzy information processing problems that require simultaneous consideration of a large number of coefficients and conditions.

The neural network model is a data processing architecture built based on neural network ideas.

The neural network model in the operation refers to a model including, but not limited to, a visual geometry group (VGG) model or a residual neural network (ResNe) model.

The network layer in the neural network model refers to functional nodes that execute particular functional processing on input data, and data may be transferred between network layers. The parameters to be quantized of the network layer in the current operation are parameters that need quantization processing, and may be, for example, parameters in the network layer and/or parameters input to the network layer.

At S102, whether values of the parameters to be quantized are all positive numbers is determined.

After the parameters to be quantized of the network layer in the neural network model are obtained, whether the values of the parameters to be quantized are all positive numbers is further determined. When the values of the parameters to be quantized are all positive numbers, an asymmetric linear quantization logic having high quantization accuracy is used to execute a quantization operation on the parameters to be quantized. That is, if the values of the parameters to be quantized are all positive numbers, S103 is executed.

When the values of the parameters to be quantized are not all positive numbers, that is, when the values of the parameters to be quantized have both positive numbers and negative numbers, or are all negative numbers, a quantization operation is performed on the parameter to be quantized using a symmetric linear quantization logic that has a smaller amount of operation of a quantization process of negative values relative to the asymmetric linear quantization logic. That is, when the values of the parameters to be quantized are not all positive numbers, S104 is executed.

At S103, a quantization operation is executed, based on an asymmetric linear quantization logic, on the parameters to be quantized.

Since asymmetric linear quantization has higher accuracy compared with symmetric linear quantization, but introduces zero point bias, which brings about the necessity of removing the zero point bias based on the negative values obtained after asymmetric linear quantization and thus further generates an additional operation overhead, when the values of the parameters to be quantized are all positive numbers, the method uses the asymmetric linear quantization logic to execute the quantization operation on the parameters to be quantized, thereby improving quantization accuracy of the neural network model.

At S104, a quantization operation, is executed, based on a symmetric linear quantization logic, on the parameters to be quantized.

When the values of the parameters to be quantized are not all positive numbers, the method uses the symmetric linear quantization logic to execute the quantization operation on the parameters to be quantized, such that the amount of computation required to subtract the zero point bias from the input feature data of the convolution nodes may be reduced, and processing performance of the neural network model may be improved.

At S105, features of an input image are extracted by using the neural network model for which the quantization operation has been executed.

The embodiments of the present disclosure provide a hybrid quantization manner after the neural network model is trained. When the values of the parameters to be quantized are all positive numbers, the quantization operation is executed on the parameters to be quantized based on the asymmetric linear quantization logic, which, compared with symmetric quantization, may add one bit of valid data, and improve quantization accuracy. When the values of the parameters to be quantized are not all positive numbers, the quantization operation is executed on the parameters to be quantized based on the symmetric linear quantization logic, which, compared with asymmetric linear quantization, may reduce the amount of computation required to subtract the zero point bias from the input feature data of the convolution nodes, and improve the processing performance of the neural network model. Therefore, the neural network model for which the quantization operation has been executed is utilized to extract the features of the input image, such that efficiency of extracting the image features by the neural network model may be improved while accuracy of the neural network model to extract image feature may be ensured.

It should be noted that in the embodiment, a data type of the parameters to be quantized is a FLOAT data type. i.e. floating-point type. When executing the quantization operation on the parameters to be quantized based on the asymmetric linear quantization logic, the quantization operation for conversion to a UINT data type is executed on the parameters to be quantized based on the asymmetric linear quantization logic, where the UINT data type is an integer type without a sign bit. When the quantization operation is executed on the parameters to be quantized based on the symmetric linear quantization logic, the quantization operation for conversion to an INT data type is executed on the parameters to be quantized based on the symmetric linear quantization logic, where the INT data type is a data type with a sign bit. Furthermore, as an exemplary embodiment, the UINT data type includes a UINT8 data type; and the INT data type includes an INT8 data type.

In the embodiments, the parameters to be quantized of the FLOAT data type are converted into parameters of the INT8 data type based on the symmetric linear quantization logic, and the parameters to be quantized of the FLOAT data type are converted into parameters of the UINT8 data type based on the asymmetric linear quantization logic. Since both INT8 and UINT8 are data types that occupy 8 bits, which have reduced number of bits compared with the FLOAT data type, the total amount of data of the quantized parameters may be effectively reduced, and stability of the neural network model to operate in a device may be effectively improved.

Based on the above embodiment, as an exemplary embodiment, when there is a parameter addition operation or a parameter concat operation between the network layers, the method may further include:

counted values of nodes having a data point-by-point addition or concat operation that execute operations including shortcut and concat are corrected to make quantization coefficients of respective converged branches consistent.

The counted values may include weight values and activation values.

In an exemplary implementation, a correction process of the counted values may include the following operations. The nodes having the data point-by-point addition or concat operation that execute the operations including shortcut and concat are determined as nodes to be corrected. A maximum value in counted values of all precursor nodes corresponding to a current node is selected and the selected maximum value is set as counted values of all the precursor nodes, wherein the current node is any one of all the nodes to be corrected.

An exclusive OR operation is executed on identity values of all the precursor nodes corresponding to the current node to obtain an operation value. When the operation value is an asymmetric identity value, output identity values of all the precursor nodes are updated to the operation value, and input identity values of nodes, which take outputs of the precursor nodes as inputs, are updated as the operation value. When the operation value is a symmetric identity value, both an input identity value and an output identity value of the current node are updated to the operation value, and input identity values of nodes, which take an output of the current node as an input, are updated to the operation value.

Figure 2:
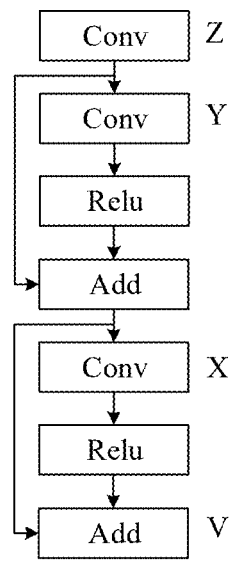
FIG. 2 is a schematic diagram of a path relation between network layers in a neural network model in a practical application scenario provided in some embodiments of the present disclosure.

FIG. 2 is a schematic diagram of a path relation between network layer nodes in a neural network model in a practical application scenario. Precursor nodes of a node V. i.e., the last nodes of counting information of a parameter counting module on two branches (Y, X, and Z nodes in the figure), may be determined according to FIG. 2. In an exemplary implementation, the number "1" may be used to represent an asymmetric identity value, the number "0" may be used to represent a symmetric identity value, a value of O_UI may be used to represent an output identity value of the node, and a value of I_UI may be used to represent an input identity value of the node. A maximum value in counted values of the precursor nodes is selected and the selected maximum value is set as counted values of all the precursor nodes, so as to make scaling coefficients of the two branches consistent, enabling an addition operation for the two branches.

An exclusive OR operation is carried out on O_UI identity values of all the precursor nodes corresponding to the current node to obtain an operation value of P. If P=1, O_UI of all the precursor nodes is updated as O_UI=1, and moreover, I_UI of nodes, which take the precursor nodes as inputs, is recursively updated as I_UI=P. Otherwise, there is no need to update O_UI of the precursor nodes, I_UI and O_UI of the current node are set as I_UI=P and O_UI=P, and moreover, I_UI of nodes, which take an output of the current node as an input, is recursively set as I_UI=P.

In the embodiments of the present disclosure, the counted values of the nodes having a shortcut or concat operation are corrected, such that the scaling coefficients of the two branches may be consistent, thereby enabling an addition operation.

In the embodiments of the present disclosure, the parameters to be quantized may include initial weight quantized values and activation values of the network layer. A process of executing the quantization operation on the initial weight quantized values of the network layer includes operations as follows. Each value in a first preset value interval is selected as a rounding point, and whether an absolute value of a decimal part of each initial weight quantized value is greater than the rounding point is determined. When the absolute value of the decimal part of the initial weight quantized value is greater than the rounding point, the initial weight quantized value is rounded up to obtain a target weight quantized value; otherwise, the initial weight quantized value is rounded down to obtain the target weight quantized value. The target weight quantized values and input features of the network layer are convolved to obtain convolution values. Mean square errors are computed based on the convolution values and an original convolution value. A target weight quantized value having a smallest mean square error among the convolution values as a final weight quantized value.

The initial weight quantized values may be computed according to weight values and weight quantization coefficients corresponding to the weight values, and the weight quantization coefficients may be computed according to counted values corresponding to weights and weight bandwidth values set by the counted values.

In an exemplary implementation, according to weight parameters of convolution nodes, $$s = \frac{R_{max}}{2^k}$$

may be calculated, where $R_{max}$ represents the counted value corresponding to the weight. When symmetric quantization is used, k=7, and when asymmetric quantization is used, k=8. The weight quantization coefficient is $s_w$=ceil($\log_2$ s). The initial weight quantized value is $$\frac{Weight}{s_w},$$

where Weight represents a weight value.

When the O_UI identity value is equal to 0, the weight values are quantized according to a symmetric quantization method, and when the O_UI identity value is equal to 1, the weight values are quantized according to an asymmetric quantization method.

In the embodiments of the present disclosure, each value in a value interval of [0:0.05:1.0] may be selected as a rounding point, and FLOAT type quantized values of weights are rounded to obtain a target weight quantized value $$\left[\frac{Weight}{s_w}\right]_i$$

of an INT8 type.

For example, when the rounding point is 0.45, the quantized value $$\left[\frac{Weight}{s_w}\right]_i$$

(INT8 type) of 10.36 is 10, and the quantized value $$\left[\frac{Weight}{s_w}\right]_i$$

of 45.56 is 46.

The target weight quantized values and input features (FLOAT type) of the layer are convolved, and obtained convolution values and an original convolution value are utilized to compute mean square errors (MSEs).

$$\left[\frac{Weight}{s_w}\right]_i$$

having the smallest MSE is a final weight quantized value of the layer.

The neural network model involves computation of a bias. In order to unify the biases and the weight quantized values, in the embodiments of the present disclosure, the biases may be quantized. In an exemplary implementation, initial bias values may be quantized according to the weight quantization coefficients and quantization coefficients of the input features to obtain quantized bias values.

For the biases of the convolution nodes, products of the weight quantization coefficients and the quantization coefficients of the input features, i.e., $s_w*s_i$, may be used as quantization coefficients of the biases.

The initial bias value of the original FLOAT type is Bf, the quantized bias value of the INT32 type is a rounded value of $B_q=B_f*s_w*s_i$. Herein, $s_w$ represents the weight quantization coefficient of an input of the layer, and $s_i$ represents the quantization coefficient of the input features.

In the embodiments of the present disclosure, in order to improve processing accuracy of the quantized neural network model, the division operation may be replaced with a displacement operation when quantization of the activation values is executed.

In an exemplary implementation, a scaling coefficient (SC) is computed according to an equation $$SC = \frac{s_0}{s_w * s_i},$$

where $s_o$ represents an activation quantization coefficient, $s_w$ represents the weight quantization coefficient, $s_i$ represents the quantization coefficient of the input features, and the activated quantization coefficient is computed according to a counted value corresponding to a node and an activation bandwidth value set by the counted value. The manner of computing the activation quantization coefficient may refer to the manner of computing the weight quantization coefficient, which will not be repeated herein.

A displacement value n is computed according to an equation $SC=2^{-n}$.

By means of the method for obtaining $s_o$ and $s_w$ above, it may be seen that values of $s_o$, $s_w$ and $s_i$ are each power of 2, and therefore, a value of SC is also power of 2, and the displacement value n computed according to the equation is an integer value.

A convolution operation is executed on the weight quantized values and the quantized values of the input features to obtain an operation result, and sum values of the operation result and the quantized bias values are used as initial convolution results; and displacement processing is executed on the initial convolution results according to the displacement value, so as to obtain activation quantized values.

In an exemplary implementation, the initial convolution results Y may be computed according to the following equation:

$$Y=conv(W,I)+B_q.$$

where W represents the weight quantized value, I represents the quantized value of the input features, and $B_q$ represents a quantized bias value. The initial convolution result Y is subjected to displacement processing to obtain the activation quantized value $Y_q=Y>>n$ of the node.

It should be noted that in the numeric conversion process described above, truncation processing is needed if a parameter is outside a maximum range value as which the parameter is able to be represented. That is, if the parameter is outside the maximum range value as which the parameter is able to be represented, the value of the parameter is equal to the maximum range value.

In the embodiments of the present disclosure, in consideration that data of the image are original values of 0-255, in order to ensure accuracy of extracting the image features by the neural network model, before the neural network model for which the quantization operation has been executed may be utilized to extract the features of the input image, the input image is normalized.

According to the method for extracting image features provided in the embodiments of the present disclosure, the parameters to be quantized of the network layer in the neural network model are obtained, and then whether the values of the parameters to be quantized are all positive numbers is further determined. When the values of the parameters to be quantized are all positive numbers, the quantization operation is executed on the parameters to be quantized based on the asymmetric linear quantization logic; and when the values of the parameters to be quantized are not all positive numbers, the quantization operation is executed on the parameters to be quantized based on the symmetric linear quantization logic. Since asymmetric linear quantization has higher accuracy compared with symmetric linear quantization, but introduces zero point bias, which brings about the necessity of removing the zero point bias based on the negative values obtained after asymmetric linear quantization and thus further generates an additional operation overhead, when the values of the parameters to be quantized are all positive numbers, the method uses the asymmetric linear quantization logic to execute the quantization operation on the parameters to be quantized, and when the values of the parameters to be quantized are not all positive numbers, the method uses the symmetric linear quantization logic to execute the quantization operation on the parameters to be quantized, such that accuracy of parameter data quantization in the neural network model may be ensured. The neural network model for which the quantization operation has been executed is utilized to extract the features of the input image, such that efficiency of extracting the image features by the neural network model may be improved while accuracy of extracting the image features by the neural network model may be ensured.

Figure 3:
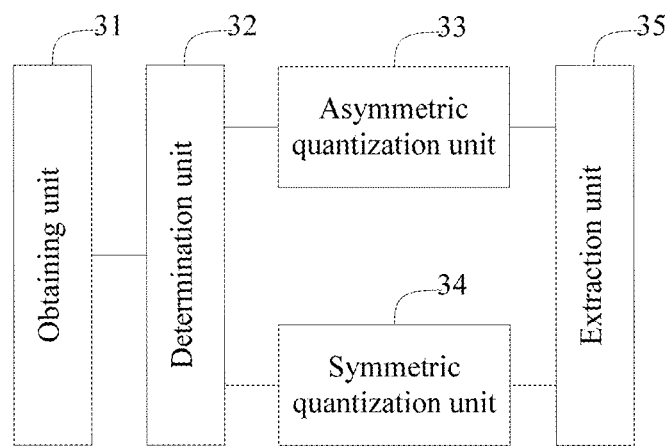
FIG. 3 is a schematic structural diagram of an apparatus for extracting image features provided in some embodiments of the present disclosure.

With reference to FIG. 3, some embodiments of the present disclosure provide an apparatus for extracting image features. The apparatus includes an obtaining unit 31, a determination unit 32, an asymmetric quantization unit 33, a symmetric quantization unit 34 and an extraction unit 35.

The obtaining unit 31 is configured to obtain parameters to be quantized of a network layer in a neural network model.

The determination unit 32 is configured to determine whether values of the parameters to be quantized are all positive numbers.

The asymmetric quantization unit 33 is configured to execute, based on an asymmetric linear quantization logic, a quantization operation on the parameters to be quantized when the values of the parameters to be quantized are all positive numbers.

The symmetric quantization unit 34 is configured to execute, based on a symmetric linear quantization logic, a quantization operation on the parameters to be quantized when the values of the parameters to be quantized are not all positive numbers.

The extraction unit 35 is configured to extract features of an input image by using the neural network model for which the quantization operation has been executed.

In some exemplary implementations, the apparatus may further include a correction unit.

The correction unit is configured to correct counted values of nodes having a data point-by-point addition or concat operation that execute operations including shortcut and concat, to make quantization coefficients of respective converged branches consistent.

In some exemplary implementations, the correction unit includes a counting subunit, a selection subunit, an operation subunit, a first update subunit and a second update subunit.

The counting subunit is configured to determine the nodes having the data point-by-point addition or concat operation that execute the operations including shortcut and concat as nodes to be corrected.

The selection subunit is configured to select a maximum value in counted values of all precursor nodes corresponding to a current node and set the selected maximum value as counted values of all the precursor nodes, wherein the current node is any one of all the nodes to be corrected.

The operation subunit is configured to execute an exclusive OR operation on identity values of all the precursor nodes corresponding to the current node to obtain an operation value.

The first update subunit is configured to update output identity values of all the precursor nodes to the operation value, and update input identity values of nodes, which take outputs of the precursor nodes as inputs, as the operation value when the operation value is an asymmetric identity value.

The second update subunit is configured to update both an input identity value and an output identity value of the current node to the operation value, and update input identity values of nodes, which take an output of the current node as an input, as the operation value when the operation value is a symmetric identity value.

In some exemplary implementations, for the operation of executing a quantization operation on initial weight quantized values of a network layer, the apparatus includes a selection unit, a weight value determination unit, a rounding-up unit, a rounding-down unit, a computation unit and a setting unit.

The selection unit is configured to, for initial weight quantized values of the network layer, select each value in a first preset value interval as a rounding point, wherein the initial weight quantized values are computed according to weight values and weight quantization coefficients corresponding to the weight values, and the weight quantization coefficients are computed according to counted values corresponding to weights and weight bandwidth values set by the counted values.

The weight value determination unit is configured to determine whether an absolute value of a decimal part of each initial weight quantized value is greater than the rounding point; trigger the rounding-up unit when the absolute value of the decimal part of the initial weight quantized value is greater than the rounding point; and otherwise, trigger the rounding-down unit.

The rounding-up unit is configured to round up the initial weight quantized value to obtain a target weight quantized value.

The rounding-down unit is configured to round down the initial weight quantized value to obtain the target weight quantized value.

The computation unit is configured to convolve the target weight quantized values and input features of the network layer to obtain convolution values, and compute mean square errors based on the convolution values and an original convolution value.

The setting unit is configured to set a target weight quantized value having a smallest mean square error among the convolution values as a final weight quantized value.

In some exemplary implementations, the apparatus may further include a bias quantization unit.

The bias quantization unit is configured to quantize initial bias values according to the weight quantization coefficients and quantization coefficients of the input features to obtain quantized bias values. In an exemplary implementation, the initial bias values may be quantized according to the weight quantization coefficients and quantization coefficients of the input features to obtain quantized bias values.

In some exemplary implementations, for the operation of executing a quantization operation on the parameters to be quantized, the apparatus includes a scaling coefficient computation unit, a displacement value computation unit, a serving unit and a displacement unit.

The scaling coefficient computation unit is configured to compute a scaling coefficient (SC) according to an equation $$SC = \frac{s_0}{s_w * s_i},$$

$s_o$ represents an activation quantization coefficient, $s_w$ represents the weight quantization coefficient, $s_i$ represents the quantization coefficient of the input features, and the activation quantization coefficient is computed according to a counted value corresponding to a node and an activation bandwidth value set by the counted value.

The displacement value computation unit is configured to compute a displacement value n according to an equation $SC=2^{-n}$.

The serving unit is configured to execute a convolution operation on the weight quantized values and quantized values of the input features to obtain an operation result, and use sum values of the operation result and the quantized bias values as initial convolution results.

The displacement unit is configured to execute displacement processing on the initial convolution results according to the displacement value to obtain activation quantized values.

In some exemplary implementations, the apparatus may further include a normalization unit.

The normalization unit is configured to normalize the input image before the extracting features of an input image by using the neural network model for which the quantization operation has been executed.

Description of features in the embodiments corresponding to FIG. 3 may refer to relevant description of the embodiments corresponding to FIG. 1, which will not be repeated herein.

According to the apparatus for extracting image features provided in the embodiments of the present disclosure, the parameters to be quantized of the network layer in the neural network model are obtained, and then whether the values of the parameters to be quantized are all positive numbers is further determined. When the values of the parameters to be quantized are all positive numbers, the quantization operation is executed on the parameters to be quantized based on the asymmetric linear quantization logic; and when the values of the parameters to be quantized are not all positive numbers, the quantization operation is executed on the parameters to be quantized based on the symmetric linear quantization logic. Since asymmetric linear quantization has higher accuracy compared with symmetric linear quantization, but introduces zero point bias, which brings about the necessity of removing the zero point bias based on the negative values obtained after asymmetric linear quantization and thus further generates an additional operation overhead, when the values of the parameters to be quantized are all positive numbers, the apparatus uses the asymmetric linear quantization logic to execute the quantization operation on the parameters to be quantized, and when the values of the parameters to be quantized are not all positive numbers, the apparatus uses the symmetric linear quantization logic to execute the quantization operation on the parameters to be quantized, such that accuracy of parameter data quantization in the neural network model may be ensured. The neural network model for which the quantization operation has been executed is utilized to extract the features of the input image, such that efficiency of extracting the image features by the neural network model may be improved while accuracy of extracting the image features by the neural network model may be ensured.

Figure 4:
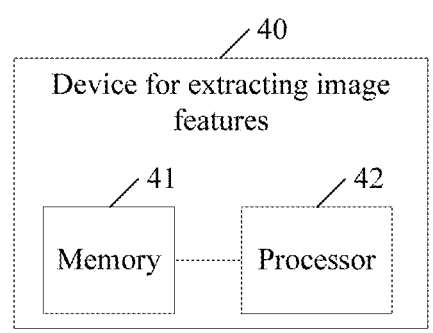
FIG. 4 is a schematic structural diagram of a device for extracting image features provided in some embodiments of the present disclosure.

FIG. 4 is a schematic structural diagram of a device for extracting image features 40 provided in some embodiments of the present disclosure. The device includes:
 a memory 41 for storing a computer program; and
 a processor 42 for implementing operations of the method for extracting image features of any one of the above when executing the computer program.

According to the device for extracting image features provided in the embodiments of the present disclosure, parameters to be quantized of a network layer in a neural network model are obtained, and then whether values of the parameters to be quantized are all positive numbers is further determined. When the values of the parameters to be quantized are all positive numbers, a quantization operation is executed on the parameters to be quantized based on an asymmetric linear quantization logic; and when the values of the parameters to be quantized are not all positive numbers, a quantization operation is executed on the parameters to be quantized based on a symmetric linear quantization logic. Since asymmetric linear quantization has higher accuracy compared with symmetric linear quantization, but introduces zero point bias, which brings about the necessity of removing the zero point bias based on the negative values obtained after asymmetric linear quantization and thus further generates an additional operation overhead, when the values of the parameters to be quantized are all positive numbers, the device uses the asymmetric linear quantization logic to execute the quantization operation on the parameters to be quantized, and when the values of the parameters to be quantized are not all positive numbers, the device uses the symmetric linear quantization logic to execute the quantization operation on the parameters to be quantized, such that accuracy of parameter data quantization in the neural network model may be ensured. The neural network model for which the quantization operation has been executed is utilized to extract features of an input image, such that efficiency of extracting the image features by the neural network model may be improved while accuracy of extracting the image features by the neural network model may be ensured.

In addition, the embodiments of the present disclosure further provide a computer-readable storage medium. The computer-readable storage medium stores a computer program, where the computer program implements, when executed by a processor, operations of the method for extracting image features of the above.

According to the computer-readable storage medium provided in the embodiments of the present disclosure, parameters to be quantized of a network layer in a neural network model are obtained, and then whether values of the parameters to be quantized are all positive numbers is further determined. When the values of the parameters to be quantized are all positive numbers, a quantization operation is executed on the parameters to be quantized based on an asymmetric linear quantization logic; and when the values of the parameters to be quantized are not all positive numbers, a quantization operation is executed on the parameters to be quantized based on a symmetric linear quantization logic. Since asymmetric linear quantization has higher accuracy compared with symmetric linear quantization, but introduces zero point bias, which brings about the necessity of removing the zero point bias based on the negative values obtained after asymmetric linear quantization and thus further generates an additional operation overhead, when the values of the parameters to be quantized are all positive numbers, the computer-readable storage medium uses the asymmetric linear quantization logic to execute the quantization operation on the parameters to be quantized, and when the values of the parameters to be quantized are not all positive numbers, the computer-readable storage medium uses the symmetric linear quantization logic to execute the quantization operation on the parameters to be quantized, such that accuracy of parameter data quantization in the neural network model may be ensured, and accuracy and computation performance of a deduction process of use of the neural network model may be improved.

The method, apparatus and device for extracting image features, and the storage medium provided in the embodiments of the present disclosure are described above in detail. Each embodiment in the description is described in a progressive manner, each embodiment focuses on differences from other embodiments, and the same and similar parts between the embodiments may refer to each other. Since an apparatus disclosed in the embodiments corresponds to a method disclosed in the embodiments, the apparatus is described simply, and relevant contents may be seen from partial description of the method. It should be noted that several improvements and modifications may further be made by those having ordinary skill in the art without departing from the principles of the present disclosure, which also fall within the scope of protection of the present disclosure.

It should be noted that relational terms in the description, such as first and second are merely used to distinguish one entity or operation from another entity or operation without necessarily requiring or implying any actual such relation or order between such entities or operations. Moreover, terms "include", "contain", or any other variations thereof are intended to cover non-exclusive inclusions, such that a process, a method, an article, or a device including a series of elements not only includes those elements, but also includes other elements that are not explicitly listed, or may further include inherent elements of the process, the method, the article, or the device. Without more restrictions, elements defined by the sentence "including a . . . " do not exclude the existence of other identical elements in the process, method, article, or device including the elements.

What is claimed is:

1. A method for extracting image features, comprising:
    obtaining parameters to be quantized of a network layer in a neural network model;
    determining whether values of the parameters to be quantized are all positive numbers;
    when the values of the parameters to be quantized are all positive numbers, executing, based on an asymmetric linear quantization logic, a quantization operation on the parameters to be quantized;
    when the values of the parameters to be quantized are not all positive numbers, executing, based on a symmetric linear quantization logic, a quantization operation on the parameters to be quantized; and
    extracting features of an input image by using the neural network model for which the quantization operation has been executed;
    wherein the method for extracting image features further comprises: correcting counted values of nodes having a data point-by-point addition or concat operation that execute operations comprising shortcut and concat, to make quantization coefficients of respective converged branches consistent;
    wherein the correcting counted values of nodes having a data point-by-point addition or concat operation that execute operations comprising shortcut and concat, to make quantization coefficients of respective converged branches consistent comprises: determining the nodes having the data point-by-point addition or concat operation that execute the operations comprising shortcut and concat as nodes to be corrected; selecting a maximum value in counted values of all precursor nodes corresponding to a current node and setting the selected maximum value as counted values of all the precursor nodes, wherein the current node is any one of all the nodes to be corrected; executing an exclusive OR operation on identity values of all the precursor nodes corresponding to the current node to obtain an operation value; when the operation value is an asymmetric identity value, updating output identity values of all the precursor nodes to the operation value, and updating input identity values of nodes, which take outputs of the precursor nodes as inputs, as the operation value; and when the operation value is a symmetric identity value, updating both an input identity value and an output identity value of the current node to the operation value, and updating input identity values of nodes, which take an output of the current node as an input, to the operation value.

2. The method for extracting image features according to claim 1, wherein the executing a quantization operation on the parameters to be quantized comprises:
    for initial weight quantized values of the network layer, selecting each value in a first preset value interval as a rounding point;
    determining whether an absolute value of a decimal part of each initial weight quantized value is greater than the rounding point; when the absolute value of the decimal part of the initial weight quantized value is greater than the rounding point, rounding up the initial weight quantized value to obtain a target weight quantized value; otherwise, rounding down the initial weight quantized value to obtain the target weight quantized value;
    convolving the target weight quantized values and input features of the network layer to obtain convolution values, and computing mean square errors based on the convolution values and an original convolution value; and
    setting a target weight quantized value having a smallest mean square error among the convolution values as a final weight quantized value.

3. The method for extracting image features according to claim 2, further comprising:

quantizing initial bias values according to the weight quantization coefficients and quantization coefficients of the input features to obtain quantized bias values.

4. The method for extracting image features according to claim 3, wherein the executing a quantization operation on the parameters to be quantized comprises:

computing a scaling coefficient (SC) according to an equation $$SC = \frac{s_0}{s_w * s_i},$$

wherein $s_o$ represents an activation quantization coefficient, $s_w$ represents the weight quantization coefficient, $s_i$ represents the quantization coefficient of the input features, and the activation quantization coefficient is computed according to a counted value corresponding to a node and an activation bandwidth value set by the counted value;

computing a displacement value n according to an equation $SC=2^{-n}$;

executing a convolution operation on the weight quantized values and quantized values of the input features to obtain an operation result, and using sum values of the operation result and the quantized bias values as initial convolution results; and executing displacement processing on the initial convolution results according to the displacement value to obtain activation quantized values.

5. The method for extracting image features according to claim 4, wherein the initial convolution results Y are computed according to a following equation:

$$Y = conv(W,I) + B_q,$$

wherein W represents the weight quantized value, I represents the quantized value of the input features, and $B_q$ represents a quantized bias value.

6. The method for extracting image features according to claim 2, wherein the initial weight quantized values are computed according to weight values and weight quantization coefficients corresponding to the weight values, and the weight quantization coefficients are computed according to counted values corresponding to weights and weight bandwidth values set by the counted values.

7. The method for extracting image features according to claim 6, wherein the initial weight quantized value is $$\frac{Weight}{s_w},$$

wherein Weight represents a weight value, and $s_w$ represents the weight quantization coefficient.

8. The method for extracting image features according to claim 6, wherein the weight quantization coefficient is $s_w=\text{ceil}(\log_2 s)$, wherein $$s = \frac{R_{max}}{2^k},$$

$R_{max}$ represents the counted value corresponding to the weight, when symmetric quantization is used, k=7, and when asymmetric quantization is used, k=8.

9. The method for extracting image features according to claim 1, wherein before the extracting features of an input image by using the neural network model for which the quantization operation has been executed, the method further comprises:

normalizing the input image.

10. The method for extracting image features according to claim 1, wherein the parameters to be quantized of the network layer are parameters in the network layer and/or parameters input to the network layer.

11. The method for extracting image features according to claim 1, wherein a data type of the parameters to be quantized is a FLOAT data type; and the executing, based on an asymmetric linear quantization logic, a quantization operation on the parameters to be quantized comprises: executing the quantization operation for conversion to a UINT data type on the parameters to be quantized based on the asymmetric linear quantization logic, where the UINT data type is an integer type without a sign bit.

12. The method for extracting image features according to claim 11, wherein the UINT data type comprises a UINT8 data type.

13. The method for extracting image features according to claim 1, wherein a data type of the parameters to be quantized is a FLOAT data type; and the executing, based on a symmetric linear quantization logic, a quantization operation on the parameters to be quantized comprises: executing the quantization operation for conversion to an INT data type on the parameters to be quantized based on the symmetric linear quantization logic, where the INT data type is a data type with a sign bit.

14. The method for extracting image features according to claim 13, wherein the INT data type comprises an INT8 data type.

15. The method for extracting image features according to claim 1, wherein the counted values comprise weight values and activation values.

16. The method for extracting image features according to claim 1, wherein when an output identity value of a node is equal to a symmetric identity value, the weight values are quantized according to a symmetric quantization method, and when the output identity value of the node is equal to an asymmetric identity value, the weight values are quantized according to an asymmetric quantization method.

17. A device for extracting image features, comprising:
a memory for storing a computer program; and
a processor for implementing following operations when executing the computer program:
obtaining parameters to be quantized of a network layer in a neural network model;
determining whether values of the parameters to be quantized are all positive numbers;
when the values of the parameters to be quantized are all positive numbers, executing, based on an asymmetric linear quantization logic, a quantization operation on the parameters to be quantized;
when the values of the parameters to be quantized are not all positive numbers, executing, based on a symmetric linear quantization logic, a quantization operation on the parameters to be quantized; and
extracting features of an input image by using the neural network model for which the quantization operation has been executed;
wherein the processor is further configured to implement following operations when executing the computer program: correcting counted values of nodes having a data point-by-point addition or concat operation that execute operations comprising shortcut and concat, to make quantization coefficients of respective converged branches consistent;

wherein the correcting counted values of nodes having a data point-by-point addition or concat operation that execute operations comprising shortcut and concat, to make quantization coefficients of respective converged branches consistent comprises: determining the nodes having the data point-by-point addition or concat operation that execute the operations comprising shortcut and concat as nodes to be corrected; selecting a maximum value in counted values of all precursor nodes corresponding to a current node and setting the selected maximum value as counted values of all the precursor nodes, wherein the current node is any one of all the nodes to be corrected; executing an exclusive OR operation on identity values of all the precursor nodes corresponding to the current node to obtain an operation value; when the operation value is an asymmetric identity value, updating output identity values of all the precursor nodes to the operation value, and updating input identity values of nodes, which take outputs of the precursor nodes as inputs, as the operation value; and when the operation value is a symmetric identity value, updating both an input identity value and an output identity value of the current node to the operation value, and updating input identity values of nodes, which take an output of the current node as an input, to the operation value.

18. A non-transitory computer-readable storage medium, storing a computer program, wherein the computer program implements, when executed by a processor, following operations:

obtaining parameters to be quantized of a network layer in a neural network model;

determining whether values of the parameters to be quantized are all positive numbers;

when the values of the parameters to be quantized are all positive numbers, executing, based on an asymmetric linear quantization logic, a quantization operation on the parameters to be quantized;

when the values of the parameters to be quantized are not all positive numbers, executing, based on a symmetric linear quantization logic, a quantization operation on the parameters to be quantized; and extracting features of an input image by using the neural network model for which the quantization operation has been executed;

wherein the computer program further implements, when executed by a processor, following operations: correcting counted values of nodes having a data point-by-point addition or concat operation that execute operations comprising shortcut and concat, to make quantization coefficients of respective converged branches consistent;

wherein the correcting counted values of nodes having a data point-by-point addition or concat operation that execute operations comprising shortcut and concat, to make quantization coefficients of respective converged branches consistent comprises: determining the nodes having the data point-by-point addition or concat operation that execute the operations comprising shortcut and concat as nodes to be corrected; selecting a maximum value in counted values of all precursor nodes corresponding to a current node and setting the selected maximum value as counted values of all the precursor nodes, wherein the current node is any one of all the nodes to be corrected; executing an exclusive OR operation on identity values of all the precursor nodes corresponding to the current node to obtain an operation value; when the operation value is an asymmetric identity value, updating output identity values of all the precursor nodes to the operation value, and updating input identity values of nodes, which take outputs of the precursor nodes as inputs, as the operation value; and when the operation value is a symmetric identity value, updating both an input identity value and an output identity value of the current node to the operation value, and updating input identity values of nodes, which take an output of the current node as an input, to the operation value.

* * * * *